METHOD OF AND APPARATUS FOR STOPPING MACHINES

Filed Sept. 13, 1968

INVENTOR. S
RUDOLF H. WANNER
BERTHOLD MADER

BY Karl G. Ross

Attorney

United States Patent Office 3,564,367
Patented Feb. 16, 1971

3,564,367
METHOD OF AND APPARATUS FOR STOPPING MACHINES

Rudolf H. Wanner, Aystetten, and Berthold Mader, Augsburg, Germany, assignors to Fa. Bowe Bohler & Weber KG. Maschinenfabrik, Augsburg, Germany, a corporation of Germany Filed Sept. 13, 1968, Ser. No. 759,551
Claims priority, application Germany, Sept. 15, 1967, P 15 88 074.7
Int. Cl. H02p 3/16
U.S. Cl. 318—275 4 Claims

ABSTRACT OF THE DISCLOSURE

A system for braking a moving machine part in which a pulse train is generated at a frequency proportional to the velocity of the moving part, the pulse train frequency being converted into an analogous voltage proportional to such velocity. In addition, the pulse train is used to provide an output signal proportional to the distance between the instantaneous position and the desired stopping point by pulse counting, the latter signal being converted to a signal proportional to the square root of the remaining distance. A comparator is responsive to the analog signal proportional to pulse frequency and velocity and to the root signal proportional to the square root of the residual distance to provide a difference signal in accordance with which the braking of the machine part is regulated.

The invention relates to a method and apparatus for the abrupt stopping of machines, the speed of which is reduced by a brake during a residual distance to be covered before a desired stopping position is reached.

The sudden stopping of high-speed machines presents a frequently occurring problem. This applies particularly to intermittently running processing machines. In many cases it is required that a continuous alternation between operation and stopping should proceed as quickly as possible and, more particularly, that, for example in the feeders of machines for cutting endless webs, a very rapid and exact stop at a precisely defined stopping position should be ensured, so that constant lengths of cut may be obtained and the cut may be applied at an exactly marked position of the web which is generally provided with an imprint. In paper-cutting machines, for example, this may be achieved in that the feeder, which by means of spikes provided on conveyor belts or the like, engages in perforations provided in the edges of the paper thus conveying it, is driven through a friction coupling and stopped by a controllable pawl engaging in a ratchet wheel or the like secured to the driven shaft so as to be stiff against rotation. In known apparatus, the pawl is provided with attenuating means, so that the apparatus is braked for a shot time directly before it actually stops, in order to alleviate the difficulties, such as vibration of the stopped parts and destruction of the locking mechanism or the like, occurring at high speeds and when large masses are moved.

The undesirable wear of the locking mechanism cannot, however, be prevented by these known means. The force of the collision between ratchet wheel and pawl renders particularly the ratchet wheel useless after some time of operation. Moreover, the web may be slightly displaced as a result of the unavoidable play between the conveying spikes and the edges of the perforations provided at the edges of the web of paper, with the result that an undesirable displacement of the cutting position develops.

The invention seeks to provide a method and apparatus by which it is ensured that a machine or parts of a machine are stopped very rapidly yet gently at an exactly determined, desired position even at very high speeds, so that wear of the locking mechanism and the disadvantages of known apparatus may be avoided.

In accordance with the invention, the problem is solved as follows: When a machine or a moving part thereof has reached a determined position a short distance from the stopping position there is produced a pulse train, the pulse recurrence frequency of which is proportional to the speed of the machine, a first variable, for example a voltage, proportional to that frequency and a second variable decreasing as the number of pulses supplied during the residual distance to be covered decreases, a third variable proportional to the square root of the second variable being formed by a function network from the second variable, and a manipulated variable acting upon the brake being produced from the difference between the latter and the former, that is the variable proportional to the speed. Immediately before stopping a short distance from the desired stopping position, the momentary speed is thus compared with the square root of the residual distance from the stopping position and the magnitude of the required braking force is derived from the difference between both. The measures according to the invention enable rapid braking directly to zero speed even at very high speeds of the machine, and violent impacts upon arrival of the stopping position are avoided.

In one specific development of the invention, means are provided so that the value of the manipulated variable is adjusted by varying the pulse width of a pulse train acting upon the brake. The braking force is thus increased with increasing pulse width. By this measure an undesirable static friction of the brake of friction-brake construction is avoided. Moreover, such impulse control renders a determined direct-current control unnecessary.

An example is an apparatus for carrying out the method according to the invention comprising a machine connected to a friction drive which machine provided with a locking mechanism by which a driven shaft is locked as required, and with a brake acting upon the driven shaft. The invention consists essentially in means for generating a pulse train, the pulse recurrence frequency of which is proportional to the speed of the machine, means for generating a voltage or a current proportional to the pulse recurrence frequency, and means for counting the pulses and for producing a variable which decreases according to the decrease in the number of pulses from an initial value at the moment at which the machine or the driven shaft reaches a determined position a short distance from the stopping position, to a final value at the moment at which the stopping position is reached, said variable being connected to the input of a function network for extraction of the root of the input variable; the output carrying the voltage proportional to the frequency and the output of the function network being respectively connected to one of the inputs of a differentiating network the output of which supplies a variable, proportional to the difference between its input variables, for controlling the brake.

By means of apparatus thus equipped in accordance with the invention, the speed of the machine of the machine part to be stopped may be reduced to zero value at the stopping position within the minimum of time immediately before the stopping position is reached.

In one particular development of apparatus according to the invention, means are provided so that the output variable of the differentiating network controls the pulse width of a pulse generator acting upon an electromagnet by which the brake is operated. The braking force is thus increased by increasing the pulse width.

The invention is diagrammatically illustrated by way of example in the accompanying drawings, in which.

Figures 1, 2:
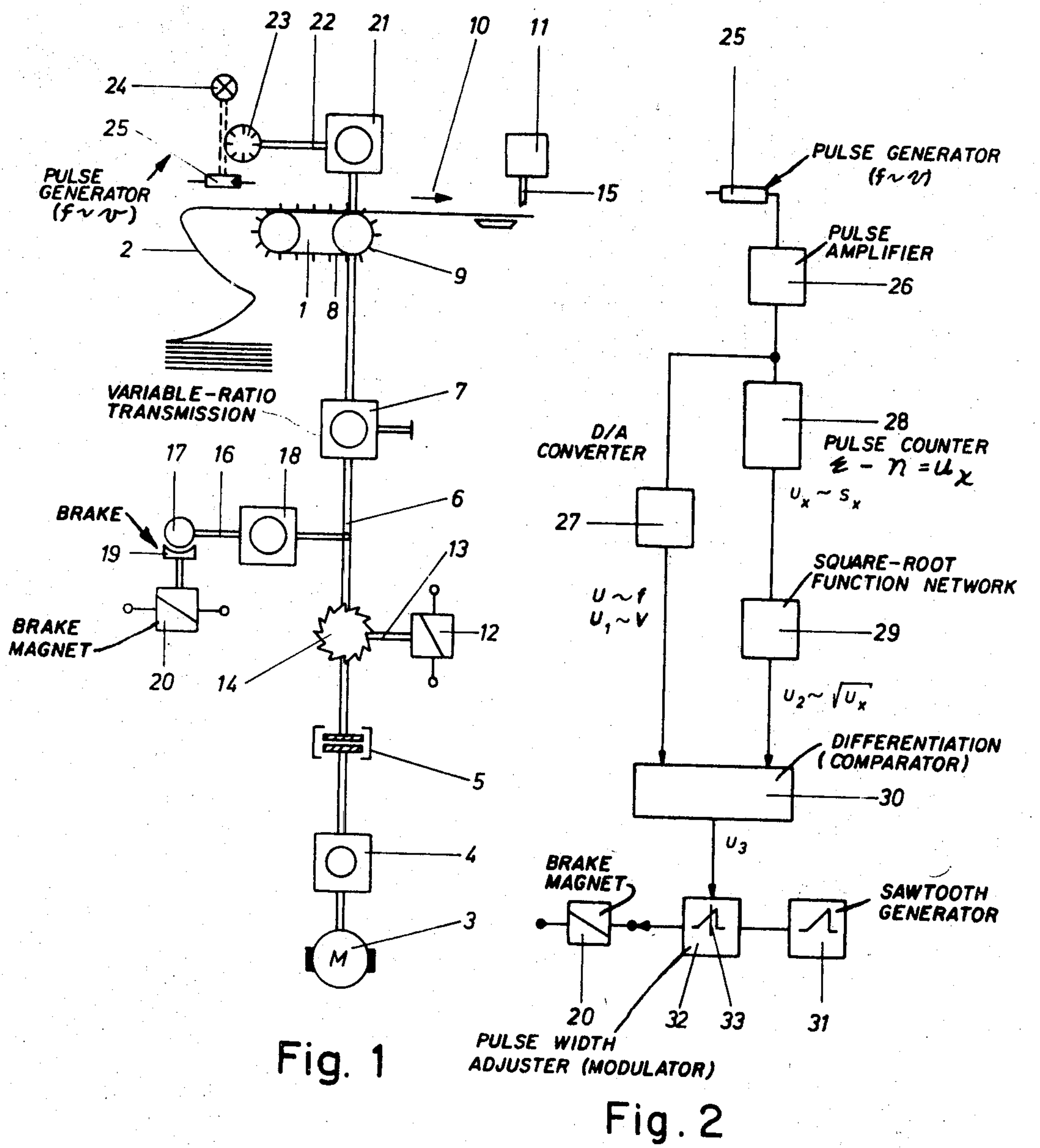
FIG. 1 shows the drive of a feeder in a paper-cutting machine.
FIG. 2 is a block diagram of the circuit according to the invention used for operating the brake.

The drive of a feeder 1 for the conveyance of a web of paper 2 in a cutting machine is diagrammatically illustrated in FIG. 1. The driving energy is supplied by a motor 3 through gearing 4 to a friction coupling 5. According to the desired lengths of feed of the web of paper 2, the torque is then transmitted to one or more driving gears of the feeder 1 from a driven shaft 6, connected to a coupling 5, through gearing 7, which is adjustable to various transmission ratios. The feeder 1 conveys the web of paper 2 with the aid of conveyor belts 8 provided on both sides of the web. The conveyor belts are provided with peripheral spikes (spokes) 9 engaging in known manner in perforations (sprocket openings) provided in the edges of the web of paper 2 thus feeding the latter in the direction of the arrow 10 to a cutting device 11.

When the web of paper 2 has been fed a determined distance in the direction of the cutting device 11, which feed may be controlled by a suitable measuring device, the feeder 1 is stopped as a result of a pawl 13, operated by an electromagnet 12 or the like, engaging in a ratchet wheel 14 mounted on the driven shaft 6 so as to be stiff (rigid) against rotation. A section of the web 2, which section corresponds to the length of feed, is then cut off by a knife 15 of the cutting device 11. Upon completion of the cut, the feeder 1 is re-started by disengagement of the pawl 13. The friction coupling 5 is, in known manner, so designed that, when the pawl 13 is in the disengaged position, a non-slip drive of the driven shaft with resultant drive of the feeder 1 is ensured.

The violent impact caused by the driven shaft 6 being stopped due to sudden engagement of the pawl 13 in the ratchet wheel 14, which rotates at a high speed, would result in torsional vibrations which would lead to an inaccurate guidance of the paper and particularly to an early wear of the locking mechanism 13, 14.

In accordance with the invention, therefore, the driven shaft 6, and thus the feeder 1, are braked directly before a determined desired stopping position at which the paper is to be cut, is reached, and its originally very high speed is reduced to a minute value, so that the impact of the ratchet wheel 14 upon the pawl 13 is reduced to the minimum.

For this purpose, a brake disc 17 mounted on a shaft 16 so as to be stiff (rigid) against rotation, is connected by gearing 18 to the driven shaft 6. A brake block, brake shoe, or similar braking element 19 is pressed against the disc 17 by an electromagnet or equivalent power generator 20. The driven shaft 6, and thus the feeder 1, may be braked from a very high speed to a very low speed by pressing the braking element 19 against the brake disc 17.

A further shaft 22 carrying a perforated disc 23 or the like which is fixed against rotation thereon, is connected by gearing 21 to a shaft of the feeder 1. As the shaft 22 rotates, a beam of light of a light source 24 directed towards a photo-electric cell 25, is periodically admitted or cut off by the perforated disc 23, so that the sequence of pulses of a frequency ($f$) proportional to the feeding velocity ($v$) is produced at the terminals of the photo-electric cell 25, the number of pulses being a measure of the feeding distance covered after each individual cut. Thus, for example, the length of the paper fed between two cuts may be checked and controlled by means of these and similar other pulse generators of many known modifications.

In accordance with the invention, a rapid braking of the paper feed starting only at a short distance from the desired stopping position is safely and reliably obtained by the apparatus illustrated in FIG. 2. The pulse train generated at the output of the photoelectric cell 25 may first be amplified in an amplifier 26 and, if necessary, be converted. The pulse train is then transmitted to the input of a known network 27 (e.g. a digitalanalog converter) for the generation of a voltage proportional to the pulse recurrence frequency (see pp. 674 ff. Pulse, Digital, and Switching Waveforms, Millman & Taub, McGraw-Hill Books Co., New York, 1965). Simultaneously, the pulse-train-supplying output of amplifier 26 is connected to the input of a device for counting the pulses, at the output of which device an analogue voltage corresponding to a determined meter reading is generated. The incoming pulses are counted in this the counting and converting stage 28 upon completion of each individual cut. The number $\pi$ of counted pulses is not only a measure of the distance covered since the beginning of the feed, but also a measure of the residual distance $S_x$ from the stopping position still to be covered at any moment, inasmuch as the number $\Sigma$ of pulses for the total length of feed between two cuts is a known quantity.

According to a specific, predetermined code, a determined voltage $u_x$ generated at the output of stage 28 may be associated with each meter reading in known manner. A determined meter reading in stage 28 is a criterion of the fact that the feeding distance covered by the web of paper 2 is sufficient to ensure that only a determined residual distance from the actual stopping position, that is the braking distance $s_0$ in the course of which the braking is to take place, is still to be covered. At the moment, or if required before the moment, at which this meter reading is reached, that is to say, when the value $s_0$ of the residual distance at which braking is to be started, is reached, a voltage of a value representing a measure of that determined residual distance $s_0$ is generated at the output of stage 28. At each further pulse arriving at the input of stage 28, that is to say at each further step by one unit performed by the meter in stage 28, there is produced at the output of stage 28 a voltage of the value $u_x$, the magnitude of which corresponds, and, more particularly, is proportional to, the value of the residual distance $s_x$ which decreases steadily as the number of further pulses increases. Thus, a stepped voltage proportional to the decreasing residual distance $s_x$ appears at the output of stage 28 when the residual distance $s_0$ is reached, that is to say at the moment at which the braking of the machine is to be started.

The generation of determined desired voltage values according to a determined adjustment of a meter is a known measure. Circuits required for this purpose are familiar to persons skilled in computer, and particularly in analogue computer technology. It is thus unnecessary to give a detailed description of the circuit of stage 28 at the output of which determined, desired voltage values associated with determined meter readings corresponding to the distance covered by the machine or by the web of paper, and thus decreasing in proportion to $s_x$ when $s_0$ is reached, are generated.

The output voltage $u_x$ of the meter- and converter stage 28 is transmitted to the input of a function network 29 for extracting the root of the input volage. The ouput voltage $u_2$ appearing at the output of the function network 29 thus corresponds to the square root of the input voltage $u_x$. The construction and operation of function networks of this kind are sufficiently familiar to persons skilled in the art, particularly in the technology of operational amplifiers, so that a detailed description of the circuit of network 29 may be dispensed with.

By apparatus according to the invention, two variables $u_1$ and $u_2$ which gradually decrease in the same manner upon braking, may thus be obtained by completely different means, namely (a) from recurrence frequency of the pulses and (b) by extracting the root of voltage $u_x$ which is proportional to the distance covered.

In accordance with the invention, the two variables $u_1$ and $u_2$ are transmitted to the two inputs of a differentiating network 30 which is also known, and which produces at its output a manipulated variable corresponding to the difference between the two input variables. When, for example as a result of still inadequate braking, the speed, and thus the voltage $u_1$, increases at a determined moment in the course of the stopping distance, and the residual distance still to be covered at that moment thus decreases, and the voltage $u_2$ is lower than it would be under normal conditions, then the braking magnet 20 is controlled by the voltage $u_3$ appearing at the output of the differentiating network (comparator) 30, which voltage is proportional to the difference between $u_1$ and $u_2$, so that the magnet 20 presses the braking element 19 against the brake disc 17, or increases the pressure applied by the braking element 17, with resultant further braking of the machine, so that violent collision between pawl 13 and the ratchet wheel 14 is avoided.

In one advantageous construction according to the invention, means are provided so that the brake magnet 20 is actuated by pulses emitted from a pulse generator 31 which, in the construction illustrated on FIG. 2, is a saw-tooth generator the field strength of the magnet 20 and thus the magnitude of the braking force being controlled by adjustment of the pulse width. As illustrated in FIG. 2, the output voltage $u_3$ of differentiating network 30 controls the width of the pulses supplied by the generator 31 in a circuit 32 for varying the pulse width, for example in that, circuit 32 suppresses the part of the pulse disposed on the right-hand side of line 33, so that the magnitude of the resultant direct current flowing through magnet 20 is determined by the pulse area disposed on the left-hand side of line 33. In the construction illustrated in FIG. 2, for example, line 33 would as compared with the illustrated position, move further to the right when voltage $u_3$ increases and further to the left when voltage $u_3$ decreases. The circuit 32 may be any one of numerous known circuits used for pulse width variation.

It will be appreciated that the idea underlying the invention, namely the idea of comparing a variable proportional to the speed with a variable proportional to the root of the respective residual distance, and of deriving from the difference between the two variables a corresponding manipulated variable for controlling the braking force may also be effected by other means.

We claim:

1. A method of immobilizing a moving machine part at a predetermined position, comprising the steps of:

(a) generating a pulse train of a pulse frequency proportional to the velocity of said moving part during displacement thereof;

(b) deriving a first control signal from said pulse train with an amplitude proportional to said pulse frequency and to the velocity of said moving part;

(c) counting the pulses of said pulse train and comparing the counted pulses with a standard to derive an output signal representing the distance between the instantaneous position of said moving part and said predetermined position;

(d) transforming the output signal in step (c) into a square-root function thereof, thereby generating a second control signal proportional to the square root of said distance;

(e) braking said moving part in response to the difference of said first and second control signals, and (f) immobilizing said moving part upon braking in step (e) at said predetermined position.

2. The method defined in claim 1 wherein said moving part is braked in step (e) by applying a pulse train to a brake connected with said moving part and varying the pulse width of the pulse train applied to said brake in accordance with the difference of said first and second control signals.

3. A system for immobilizing a moving machine part at a predetermined position, comprising a brake operatively connected with said machine part; a pulse generator operatively connected with said machine part for producing a pulse train of a pulse frequency proportional to the velocity of said moving part during displacement thereof; means for deriving a first control signal from said pulse train with an amplitude proportional to said pulse frequency and to the velocity of said moving part; means for counting the pulses of said pulse train and comparing the counted pulses with a standard to derive an output signal representing the distance between the instantaneous position of said moving part and said predetermied position; means for converting said output signal into a square-root function thereof, thereby generating a second control signal proportional to the square root of said distance; and means responsive to said first and second control signals and operatively connected to said brake for energizing same to brake said moving part in response to the difference of said first and second control signals.

4. The system defined in claim 3, further comprising means for generating a pulse train applicable to said brake, and modulator means for varying the width of the pulses of the pulse train applied to said brake in response to the difference of said first and second control signals.

References Cited

UNITED STATES PATENTS

| | | | |
|---|---|---|---|
| 3,322,961 | 5/1967 | Harrison et al. | 226—33 |
| 3,344,330 | 9/1967 | Belanich et al. | 318—275 |
| 3,380,495 | 4/1968 | Weston, Jr. | 318—365 |
| 3,425,515 | 2/1969 | McDonald et al. | 318—18 |
| 3,435,310 | 3/1969 | Bradley | 318—28 |
| 3,439,336 | 4/1969 | Toifl et al. | 318—162 |

ORIS L. RADER, Primary Examiner

K. L. CROSSON, Assistant Examiner

U.S. Cl. X.R.

192—127; 226—33, 38; 318—369, 466